United States Patent
Schwarz et al.

(10) Patent No.: US 12,532,065 B2
(45) Date of Patent: Jan. 20, 2026

(54) AUTOMATED METHOD OF ADJUSTING A VIEWING PARAMETER OF AN IN-STORE IMAGING DEVICE

(71) Applicant: Captana GmbH, Ettenheim (DE)

(72) Inventors: Thomas Schwarz, Hohberg (DE); Michael Unmüßig, Ettenheim (DE)

(73) Assignee: Captana GmbH (DE)

( * ) Notice: Subject to any disclaimer, the term of this patent is extended or adjusted under 35 U.S.C. 154(b) by 44 days.

(21) Appl. No.: 18/289,402

(22) PCT Filed: May 6, 2022

(86) PCT No.: PCT/EP2022/062252
§ 371 (c)(1),
(2) Date: Nov. 3, 2023

(87) PCT Pub. No.: WO2022/234067
PCT Pub. Date: Nov. 10, 2022

(65) Prior Publication Data
US 2024/0244316 A1  Jul. 18, 2024

(30) Foreign Application Priority Data
May 7, 2021 (FR) .................................... 2104844

(51) Int. Cl.
*G06V 10/00* (2022.01)
*G06Q 10/087* (2023.01)
(Continued)

(52) U.S. Cl.
CPC .......... *H04N 23/64* (2023.01); *G06Q 10/087* (2013.01); *G06V 10/761* (2022.01); *G06V 10/82* (2022.01);
(Continued)

(58) Field of Classification Search
CPC .... H04N 23/64; H04N 23/695; G06Q 10/087; G06Q 30/0639; G06Q 10/08;
(Continued)

(56) References Cited

U.S. PATENT DOCUMENTS 5,819,016 A * 10/1998 Watanabe ............ G01B 11/002
                                                      345/419
8,059,889 B2 * 11/2011 Kobayashi ................ G06T 7/12
                                                       348/135
(Continued)

FOREIGN PATENT DOCUMENTS

| | | |
|---|---|---|
| EP | 3032459 A1 | 6/2016 |
| FR | 3071341 A1 | 3/2019 |
| WO | 2021009244 A1 | 1/2021 |

OTHER PUBLICATIONS

International Search Report for Application No. PCT/EP2022/062252 mailed Aug. 31, 2022, pp. 1-4.

*Primary Examiner* — Frank F Huang
(74) *Attorney, Agent, or Firm* — Lerner David LLP (57) ABSTRACT

The invention relates to a method of controlling an imaging device having at least one controllable viewing parameter and arranged to capture images of an articles placement fixture, comprising the set-up steps of: —successively capturing images (CAPTx) of the articles placement fixture with the imaging device, wherein said capturing comprises controlling the at least one controllable viewing parameter to be modified between two successive image captures; —determining (Sfc) for each of the successively captured images a fixture coverage score; —selecting (SLC) a reference image as the image from among the successively captured images having the best fixture coverage score; —setting (SET) the at least one controllable viewing parameter to be the one used when capturing the reference image.

14 Claims, 4 Drawing Sheets

(51) Int. Cl.
*G06V 10/74* (2022.01)
*G06V 10/82* (2022.01)
*G06V 10/98* (2022.01)
*G06V 20/52* (2022.01)
*H04N 23/60* (2023.01)
*H04N 23/695* (2023.01)

(52) U.S. Cl.
CPC ............ *G06V 10/993* (2022.01); *G06V 20/52* (2022.01); *H04N 23/695* (2023.01)

(58) Field of Classification Search
CPC .... G06V 10/761; G06V 10/82; G06V 10/993; G06V 20/52; G09B 23/28
See application file for complete search history.

(56) References Cited

U.S. PATENT DOCUMENTS

| | | | | |
|---|---|---|---|---|
| 8,416,236 B1 * | 4/2013 | Hickman | ................ | G06T 19/20 345/419 |
| 8,818,081 B1 * | 8/2014 | Lookingbill | ............ | G06T 15/10 382/154 |
| 8,849,620 B2 * | 9/2014 | Regan | ................... | G06T 7/521 702/167 |
| 9,094,670 B1 * | 7/2015 | Furio | ....................... | G06T 19/20 |
| 2004/0089962 A1 * | 5/2004 | Valery | ................... | A61C 9/0053 264/16 |
| 2010/0141781 A1 * | 6/2010 | Lu | .......................... | G06V 40/67 348/222.1 |
| 2011/0227924 A1 * | 9/2011 | Nakajima | ............... | G06T 17/00 345/427 |
| 2012/0281873 A1 * | 11/2012 | Brown | ................... | G06T 7/251 382/103 |
| 2013/0136341 A1 * | 5/2013 | Yamamoto | ........... | G06T 1/0007 382/154 |
| 2013/0194392 A1 * | 8/2013 | Qi | .......................... | G06T 7/579 348/50 |
| 2013/0342533 A1 * | 12/2013 | Bell | ....................... | G06T 19/003 345/420 |
| 2014/0247325 A1 * | 9/2014 | Wu | ....................... | H04N 13/296 348/39 |
| 2015/0297949 A1 * | 10/2015 | Aman | ..................... | G06T 7/246 348/157 |
| 2019/0122425 A1 * | 4/2019 | Sheffield | ............. | H04N 13/243 |
| 2020/0234227 A1 | 7/2020 | Gadou et al. | | |

* cited by examiner

AUTOMATED METHOD OF ADJUSTING A VIEWING PARAMETER OF AN IN-STORE IMAGING DEVICE

CROSS-REFERENCE TO RELATED APPLICATIONS

The present application is a national phase entry under 35 U.S.C § 371 of International Application No. PCT/EP2022/062252 filed May 6, 2022, published in English, which claims priority from French Application No. 2104844 filed May 7, 2021, all of which are hereby incorporated herein by reference.

TECHNICAL FIELD

The field of the invention is the one of computer-vision-based inventory management systems and methods for warehouses or retail stores. The invention relates more particularly to capturing satisfactory images of a fixture onto which shelf devices are mounted.

DESCRIPTION OF RELATED ART

Shelves of a salespoint are generally organized in gondolas. Each gondola comprises several rows, and each row comprises several shelf labels situated in the vicinity of articles. The shelf labels are disposed along the front edge of the shelves and display information related to articles offered for sale, such as price, price per weight, name of the article, etc.

In order to allow easy and fast article information updates and to decrease the operational costs, the use of electronic shelf labels (referred to below as "ESLs") in shelves is widely known. The article information displayed on the screen of one ESL is remotely controlled by radiofrequency.

Over time, the positions of articles on sale in the shelves can change, for instance when the gondolas are re-ordered or in the case of seasonal products. In recent years, there has been an effort to create "realograms", i.e. planograms providing a realistic view of the facing of the gondolas. The realogram takes into account any changes made to the assignment of shelf spaces to articles or changes made to the assignment of ESLs to articles. The realogram is therefore meant as a reliable and up-to-date representation of the real shelving visible for the customers of the sales area.

The provision of a reliable and complete realogram allows development of a plurality of useful applications, such as specific promotional content taking into account the position of the customers in front of the shelves, or geolocation of articles within the sales area to speed up the re-stocking and/or the picking of products by the personnel of the sales area. In order to monitor the layout of articles in the shelves and to complete the realogram, an option is to install imaging systems in the sales area. The imaging systems preferably provide a real-time view of the shelves of the sales area. On the basis of the images or videos provided by the imaging systems, image processing methods are carried out for several applications, including automated detection of empty shelf spaces, automated detection of ESLs, verification of compliance between a real facing and an expected facing for the articles, etc.

Commonly used imaging systems are cameras fixed to the ceiling or at other strategic locations in the sales area. Each camera is arranged such that the direction of sight of the camera points towards the gondolas. Other imaging systems described in the international application WO 2021/009244 A1 are cameras which can be directly fitted on a shelf in the same manner as ESLs and which are therefore capable to capture images of a facing gondola.

When a new camera is installed within a sales area or when a camera is moved to a new location within the sales area, personnel of the sales area may use a mobile device capable of interacting with an inventory management server via a wireless connection. The mobile device may further be configured to establish a short-range communication with the camera, e.g. a NFC (Near Field Communication) communication, in order to register the camera within the inventory management server by providing the camera with initial settings (such as a store identifier, credentials to connect to the inventory management server, etc.). The mobile device may further be used to send a calibration command to the camera in order to adjust a controllable viewing parameter thereof, such as its direction of sight.

Anyhow, as this adjustment is being performed by a human, it is necessarily prone to errors especially when the calibration process has to be repeated for multiple cameras. As a consequence, the images captured by the cameras may not prove to be sufficiently satisfactory for the image processing methods to work correctly.

Moreover, after their installation, the cameras may be accidently moved for instance by a client so that they deviate from their initial set-up and capture inadequate images.

BRIEF DESCRIPTION OF THE INVENTION

The invention aims at overcoming at least one of the above-mentioned drawbacks.

To this purpose, the invention relates to a method of controlling an imaging device having at least one controllable viewing parameter and arranged to capture images of an articles placement fixture. The method comprises the automated set-up steps of:
  successively capturing images of the articles placement fixture with the imaging device, wherein said capturing comprises controlling the at least one controllable viewing parameter to be modified between two successive image captures;
  determining for each of the successively captured images a fixture coverage score;
  selecting a reference image as the image from among the successively captured images having the best fixture coverage score;
  setting the at least one controllable viewing parameter to be the one used when capturing the reference image.

The invention therefore provides an automatic set-up of a camera arranged to capture images of an articles placement fixture, that is capable of setting an adjustable viewing parameter of the camera so that the images it captures are of sufficient quality for their intended applications in computer-vision-based inventory management methods, especially in that they offer a satisfactory coverage of the fixture.

Certain preferred, but non-limiting aspects of the method are as follows:
  determining the fixture coverage score of one of the successively captured images comprises identifying the fixture within the image, determining a fixture matching polygon which delimits the identified fixture and calculating a deviation of the fixture matching polygon from a central alignment within the image;
  determining the fixture coverage score of each of the successively captured images is performed by a neural network processing unit;

determining the fixture coverage score of one of the successively captured images comprises identifying labels and/or products within the image, determining a point cloud having points corresponding to the identified labels and/or products and calculating a deviation of the determined point cloud from a central alignment within the image;

it further comprises sending the successively captured images from the imaging device to an image processing server configured to perform said selecting the reference image;

it further comprises, once the reference image is selected, the image processing server sending a setting command to the imaging device to cause the setting the at least one controllable viewing parameter to be the one used when capturing the reference image;

it further comprises the automated operating steps of:
  capturing a current image of the articles placement fixture with the imaging device;
  calculating a bias between the current image and a pre-evaluated image;
  determining an adjustment to be performed to the at least one controllable viewing parameter based on said bias;
  controlling the at least one controllable viewing parameter based on the determined adjustment.

calculating said bias comprises comparing the current image and the pre-evaluated image and calculating a similarity score;

calculating said bias comprises determining a fixture coverage score of the current image and comparing the fixture coverage score of the current image with the fixture coverage score of the pre-evaluated image;

it further comprises performing the automated set-up steps again in case the bias exceeds a calibration threshold;

it further comprises the step of capturing a new image of the articles placement fixture after said controlling of the at least one controllable viewing parameter and updating the pre-evaluated image to be the new image;

the at least one controllable viewing parameter comprises a direction of sight of the imaging device.

BRIEF DESCRIPTION OF THE DRAWINGS

Other aspects, aims, advantages and features of the invention will better appear upon reading the following detailed description of preferred embodiments thereof, provided as a non-limiting example, and done in reference to the appended drawings, in which.

DETAILED DESCRIPTION OF THE INVENTION

The invention relates to an automated method of controlling an imaging device having at least one controllable viewing parameter and arranged to capture images of an articles placement fixture placed in a warehouse or a retail store. The at least one controllable viewing parameter may comprise an adjustable focal length and/or an adjustable direction of sight. The imaging device may for instance comprise a motorised lens that can be rotated by an actuator around one or more axes of rotation, e.g., around one horizontal axe of rotation to enable the direction of sight to be vertically driven up or down with respect to the ground surface.

In a preferred embodiment, the imaging device is configured to be removably and reliably fitted in a receiving section of a shelf support arranged on a shelf edge of a shelf facing the articles placement fixture. Preferably, the articles placement fixture comprises shelves provided with shelf devices such as ESLs.

The method according to the invention comprises a set-up phase which can be implemented as an initial automated set-up process when the imaging device is newly installed facing an articles placement fixture.

Figure 1:
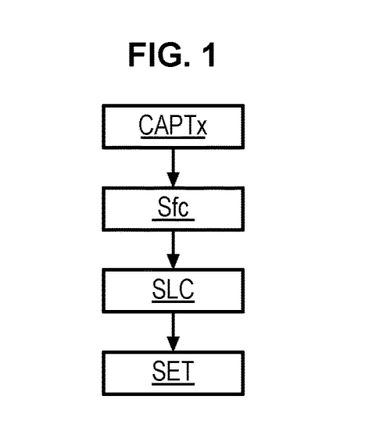
FIG. 1 is a block diagram which shows steps implemented in a set-up phase of the camera in accordance with the invention.

With reference to FIG. 1, the automated set-up phase comprises a first set-up step CAPTx of successively capturing images of the articles placement fixture with the imaging device, wherein said capturing comprises controlling the at least one controllable viewing parameter to be modified between two successive image captures. As an illustrative example, ten images of the articles placement fixture may be successively captured while modifying a viewing parameter of the imaging device. For instance, the successive images may be acquired while modifying the direction of sight of the imaging device. To this purpose, the direction of sight may be vertically lifted, for instance from bottom to top with for example a 10° increase in between two successive images.

Still with reference with FIG. 1, the set-up phase comprises a second set-up step Sfc of determining for each of the successively captured images a fixture coverage score. The fixture coverage score of an image is representative of the extent to which this image covers the fixture and therefore offers a suitable capture of the fixture.

In an embodiment, determining the fixture coverage score of one of the successively captured images comprises identifying the fixture within the image, determining a fixture matching polygon which delimits the identified fixture and calculating a deviation of the fixture matching polygon from a central alignment within the image. The area of the feature matching polygon may also be taken into account to determine the fixture coverage score, an important area within the image leading to a better score.

In a preferred embodiment, determining the fixture coverage scores is performed by a neural network processing unit. The neural network processing unit may have been previously trained for this task, for instance based on supervised learning, to determine a fixture matching polygon in an image of a fixture and to estimate a degree of central alignment of the fixture matching polygon within the image. The neural network processing unit may also have been trained to identify shelves and to estimate a horizontality of the identified shelves as a measure of the fixture coverage score. In an embodiment, the neural network processing unit comprises a first neural network dedicated to detecting a shelf in a captured image and with which polygon outline and a second neural network dedicated to detecting shelf levels with complete length. The determined fixture matching polygon may be very complex and, in some cases, slightly too big or too small. Identifying shelf levels helps to compensate these defects, thereby improving the accuracy of the matching polygon.

Figure 5:
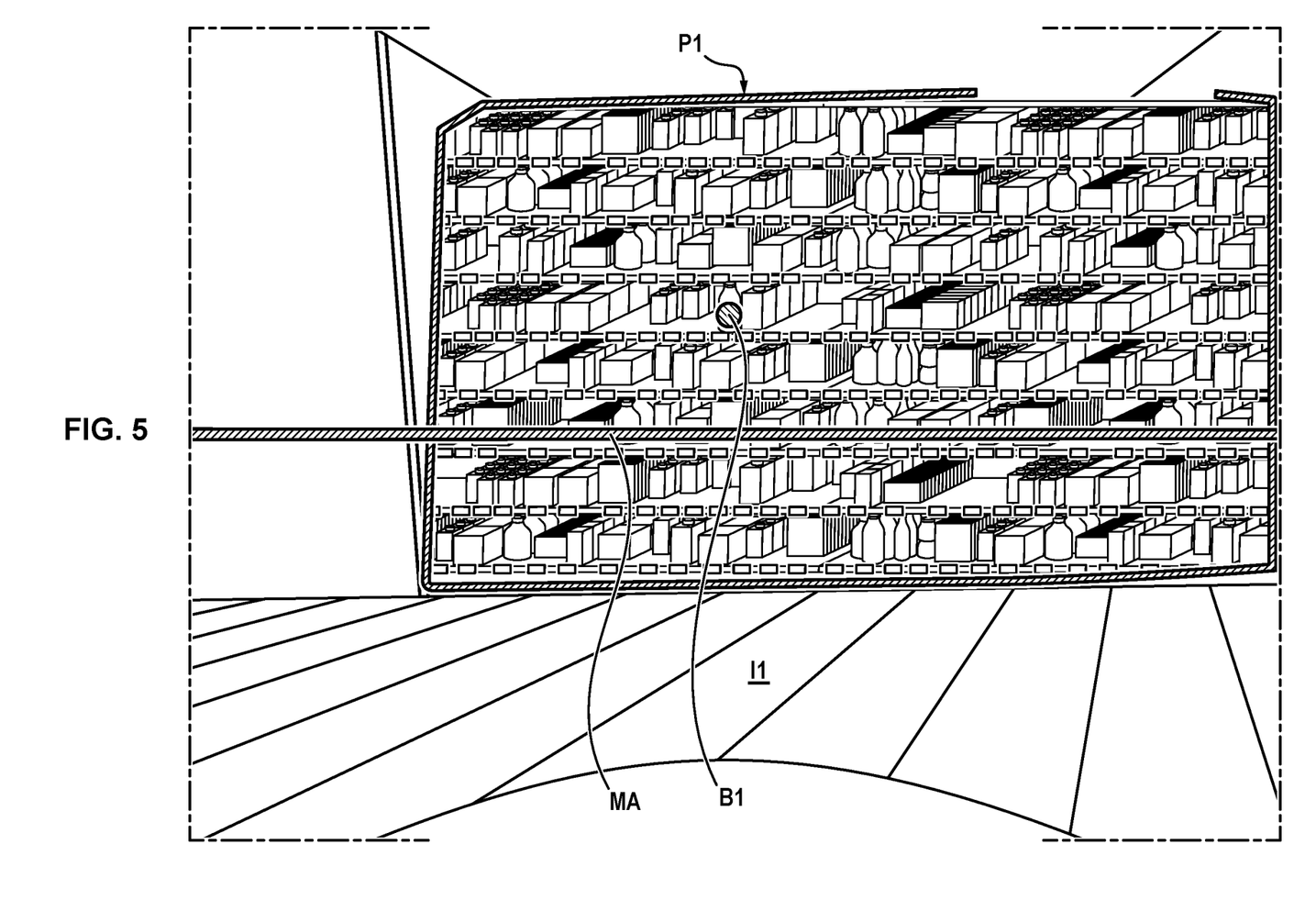
FIG. 5 shows first image of a fixture captured by the camera together with its corresponding fixture matching polygon, which first image does not offer a satisfactory coverage of the fixture.
Figure 6:
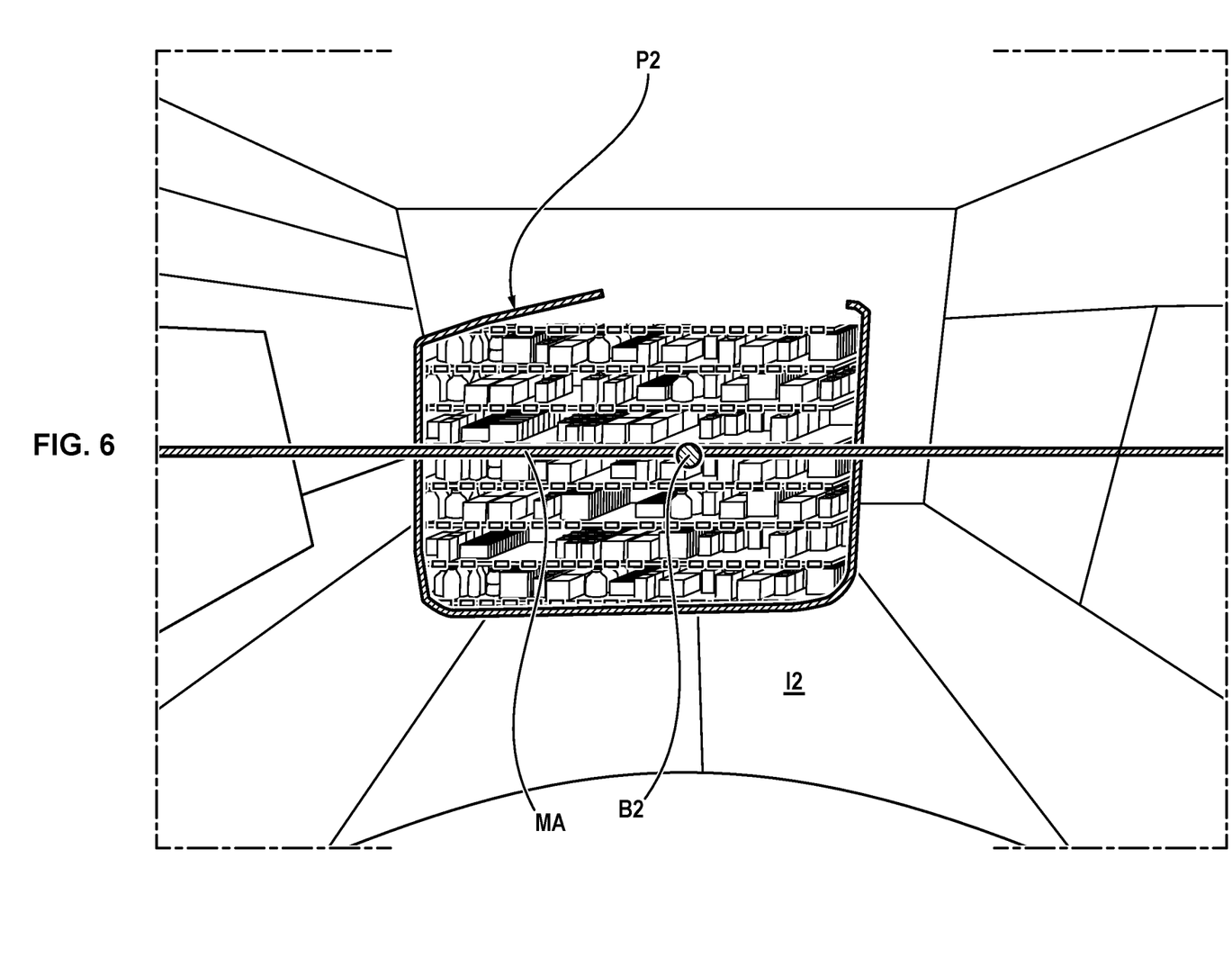
FIG. 6 shows a second image of a fixture captured by the camera together with its corresponding fixture matching polygon, which second image offers a satisfactory coverage of the fixture.
Figure 7:
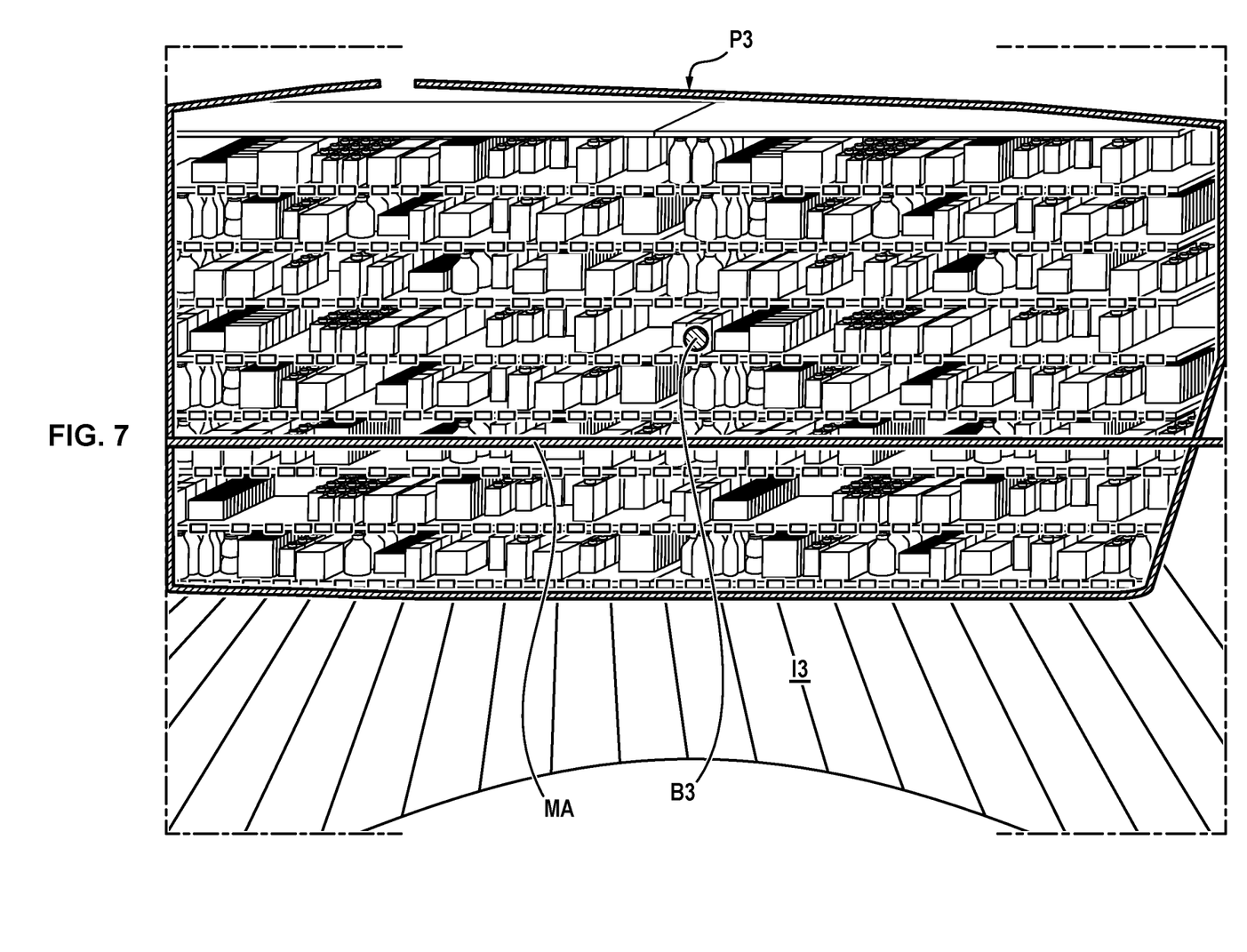
FIG. 7 shows a third image of a fixture captured by the camera together with its corresponding fixture matching polygon, which polygon is truncated.

FIGS. 5, 6 and 7 show different images 11, 12, 13 of fixtures captured by a camera together with a representation of the corresponding fixture matching polygon P1, P2, P3. Taking the example of a vertical alignment only, each of these images 11, 12, 13 can be separated into two equal parts by an image horizontal middle axis MA and calculating a deviation of the fixture matching polygon from a central alignment within the image can comprise determining a geometrical feature B1, B2, B3 of the feature matching polygon P1, P2, P3 (for example a barycentre, along the vertical axis in this example) and calculating a distance between the geometrical feature B1, B2, B3 and the image horizontal middle axis MA. In FIGS. 5 and 7, the barycentre B1, B3 is spaced from the image middle axis so that the feature matching polygon P1, P3 is considered as not centrally aligned. On FIG. 6 on the contrary, the barycentre B2 is perfectly fitted on the image horizontal middle axis MA and the feature matching polygon P2 is considered as centrally aligned.

With reference to FIG. 1 again, the set-up phase comprises a third set-up step SLC of selecting a reference image as the image from among the successively captured images having the best fixture coverage score, i.e. the image that is estimated as offering the best capture of the fixture (for instance because its captures the entirety of the fixture in a central part of the image). The set-up phase then comprises a fourth set-up SET of setting the at least one controllable viewing parameter to be the one used when capturing the reference image.

In a possible embodiment, the selecting is performed only for those images which have a fixture coverage score above a selection threshold. This allows disregarding feature matching polygons which are clearly not associated to an adequate image, for instance fixture matching polygons, such as polygon P3 on FIG. 7, which do not include the fixture in its entirety but rather have the fixture truncated in that it is cut by one or more edges of the corresponding image (for instance because the direction of sight is too low or too high to capture the fixture in its entirety).

In another embodiment, which may be implemented independently or jointly with the fixture matching polygon embodiment, determining the fixture coverage score of one of the successively captured images comprises identifying labels and/or products in the image and calculating a deviation of the fixture from a central alignment within the image based on the identified labels and/or products. When implemented jointly with the fixture matching polygon embodiment, this embodiment may help to autocorrect the determined matching polygon.

Identifying a label and/or a product in the image may comprise identifying a point corresponding to the label and/or product, for instance a center point thereof. A label may include a light indicator and identifying the label in the image may be comprise detecting the blinking of the light indicator, for instance by means of a neural network. The identified points form a point cloud and calculating a deviation of the fixture from a central alignment within the image may comprise determining a geometrical feature of the point cloud (for example a barycentre, along the vertical axis in an example) and calculating a distance between the geometrical feature and the image horizontal middle axis.

In the above, a set-up of the viewing angle from bottom to top was described as an example. The skilled person will understand that the invention is not limited to this vertical adjustment but extends to finer adjustments, such as an adjustment both along the vertical and horizontal axis using for instance both the image horizontal middle axis and the image vertical middle axis.

Figure 2:
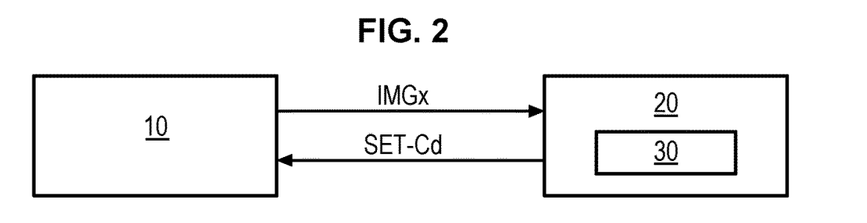
FIG. 2 shows a camera and an image processing server that can be involved in a set-phase according to FIG. 1.

With reference to FIG. 2, the method may comprise sending the successively captured images IMGx from the imaging device 10 to an image processing server 20 configured to perform said selecting the reference image. As shown on FIG. 2, the image processing server 20 may include a neural network processing unit 30 configured to determine the fixture coverage score of each of the successively captured images. As also shown on FIG. 2, once the reference image is selected, the image processing server 20 may send a setting command SET-Cd to the imaging device 20 to cause the setting the at least one controllable viewing parameter to be the one used when capturing the reference image.

The method according to the invention may further comprise an automated operating phase which can be implemented after the initial set-up phase for every newly captured image, on a regular basis or upon specific order.

Figure 3:
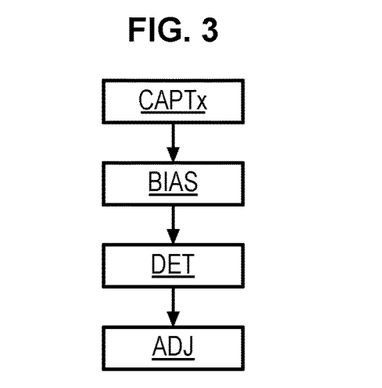
FIG. 3 is a block diagram which shows steps implemented in an operating phase of the camera in accordance with a possible embodiment of the invention.

With reference to FIG. 3, the operating phase may comprise a first operating step CAPTc of capturing a current image of the articles placement fixture with the imaging device, a second operating step BIAS of calculating a bias between the current image and a pre-evaluated image (which initially is the reference image of the set-up phase), a third step DET of determining an adjustment to be performed to the at least one controllable viewing parameter based on said bias and a fourth step ADJ of controlling the at least one controllable viewing parameter based on the determined adjustment.

In an embodiment, the steps DET and ADJ of determining the adjustment and controlling the at least one controllable viewing parameter are performed only if the calculated bias is above a deviation threshold. This avoids consuming the imaging device battery in case the current image is close to the pre-evaluated image and can therefore be considered as sufficiently satisfactory.

In an embodiment, calculating said bias comprises comparing the current image and the pre-evaluated image and calculating a similarity score.

In another embodiment, calculating said bias comprises determining a fixture coverage score of the current image (in the same manner(s) as performed in the set-up phase) and comparing the fixture coverage score of the current image with the fixture coverage score of the pre-evaluated image. In this embodiment, as in the set-up phase, the fixture coverage score may be calculated by the neural network processing unit.

In both these embodiments, the calculated bias may be compared to a threshold and the set-up steps may once again be performed in case the bias exceeds a calibration threshold. In addition, the method may comprise comparing the bias to a first calibration threshold and to a second calibration threshold greater than the first calibration threshold.

Then, in case the bias exceeds the second calibration threshold, the set-up steps are reiterated with successively capturing as many images as in the initial set-up phase while, in case the bias exceeds the first calibration threshold but not the second calibration threshold, the set-up steps are reiterated with successively capturing a reduced number of images as compared to the initial set-up phase.

In addition, in both these embodiments, a labels and/or products point cloud as discussed above can be used. More specifically, calculating the bias may comprise comparing a point cloud determined for the current image with a point could determined for the pre-evaluated image. The control of the viewing parameter is then performed so as to match the point clouds.

The method may further comprise, after said controlling ADJ of the at least one controllable viewing parameter, capturing a new image of the articles placement fixture and updating the pre-evaluated image to be the new image. By replacing the pre-evaluated image with a new one, the method avoids an error increase over time which would otherwise be observed in case reference image of the set-up phase will be kept as the pre-evaluated image and the complete process therefore remains stable over time.

Figure 4:
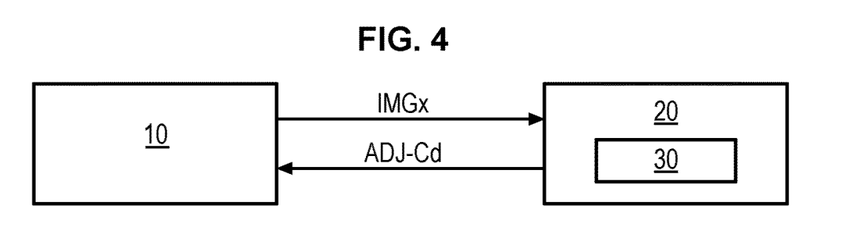
FIG. 4 shows a camera and an image processing server that can be involved in an operating phase according to FIG. 3.

With reference to FIG. 4, the operating phase method may comprise sending the current image IMGc from the imaging device 10 to the image processing server. As shown on FIG. 4, the image processing server 20 may include the neural network processing unit 30 configured to determine the fixture coverage score of the current image. As also shown on FIG. 4, once the adjustment to be performed is determined, the image processing server 20 may send an adjustment command ADJ-Cd to the imaging device 20 to cause the at least one controllable viewing parameter to match the one used when capturing the pre-evaluated image.

The invention is not limited to the method described above but also extends to an image processing server as described above. Such an image processing server is capable of communicating with an imaging device which has at least one controllable viewing parameter and which is arranged to capture images of an articles placement fixture. The image processing server further comprises a processing unit configured in particular to implement the set-up steps of determining Sfc, selecting SLC and setting ST of the set-up phase and/or to implement the operating steps of calculating BIA, determining DET and controlling ADJ of the operating phase.

The invention further extends to a computer-program product comprising instructions which, when the program is executed by a computer, cause the computer to carry out the set-up steps of determining Sfc, selecting SLC and setting ST of the set-up phase and/or to carry out the operating steps of calculating BIA, determining DET and controlling ADJ of the operating phase.

The invention claimed is:

1. An automated method of controlling an imaging device having at least one controllable viewing parameter and arranged to capture images of an articles placement fixture, the method comprising:
    determining a fixture coverage score for each of successively captured images of the articles placement fixture by the imaging device, the fixture coverage score representing an extent to which that captured image covers the articles placement fixture, wherein the at least one controllable viewing parameter is modified between successive image captures;
    selecting a single reference image from among the successively captured images, based on the determined fixture coverage scores; and
    setting the at least one controllable viewing parameter as the at least one controllable viewing parameter used to capture the reference image.

2. The automated method according to claim 1, wherein determining the fixture coverage score of at least one of the successively captured images comprises:
    identifying a fixture within the image;
    determining a fixture matching polygon which delimits the identified fixture within the image; and
    calculating a deviation of the fixture matching polygon from a central alignment within the image.

3. The automated method according to claim 1, wherein the fixture coverage score of each of the successively captured images is determined by a neural network processing unit.

4. The automated method according to claim 1, wherein determining the fixture coverage score of at least one of the successively captured images comprises:
    identifying at least one of labels or products within the image;
    determining a point cloud having points corresponding to the identified labels or products; and
    calculating a deviation of the determined point cloud from a central alignment within the image.

5. The automated method according to claim 1, further comprising receiving the successively captured images from the imaging device.

6. The automated method according to claim 1, wherein setting the at least one controllable viewing parameter comprises sending a setting command to the imaging device, the setting command comprising the at least one controllable viewing parameter used to capture the reference image.

7. The automated method according to claim 1, further comprising:
    capturing—a current image of the articles placement fixture with the imaging device;
    calculating—a bias between the current image and a pre-evaluated image;
    determining an adjustment to be performed to the at least one controllable viewing parameter based on the calculated bias; and
    controlling—the at least one controllable viewing parameter based on the determined adjustment.

8. The automated method according to claim 7, wherein calculating the bias comprises:
    comparing the current image and the pre-evaluated image; and
    calculating a similarity score based on the comparison.

9. The automated method according to claim 7, wherein calculating the bias comprises:
    determining a fixture coverage score of the current image; and
    comparing the fixture coverage score of the current image with the fixture coverage score of the pre-evaluated image.

10. The automated method according to claim 7, further comprising:
    determining that the calculated bias exceeds a calibration threshold; and
    repeating the determining a fixture coverage score for each of different successively captured images, selecting a different reference image from among the different successively captured images, and setting the at least one controllable viewing parameter as the at least one controllable viewing parameter used to capture the different reference image.

11. The automated method according to claim 7, further comprising:
   capturing a new image of the articles placement fixture after setting the at least one controllable viewing parameter; and
   updating the pre-evaluated image to be the new image.

12. The automated method according to claim 1, wherein the at least one controllable viewing parameter comprises a direction of sight of the imaging device.

13. An image processing server capable of communicating with an imaging device which has at least one controllable viewing parameter and which is arranged to capture images of an articles placement fixture, the image processing server comprising a processing unit configured to implement the automated method of claim 1.

14. A non-transitory computer-readable medium storing instructions which, when executed by a computer, cause the computer to carry out the automated method of claim 1.

\* \* \* \* \*